Dec. 10, 1929.  C. MATLOCK  1,738,717
SEPARATOR APPARATUS
Filed Nov. 22, 1923  3 Sheets-Sheet 1
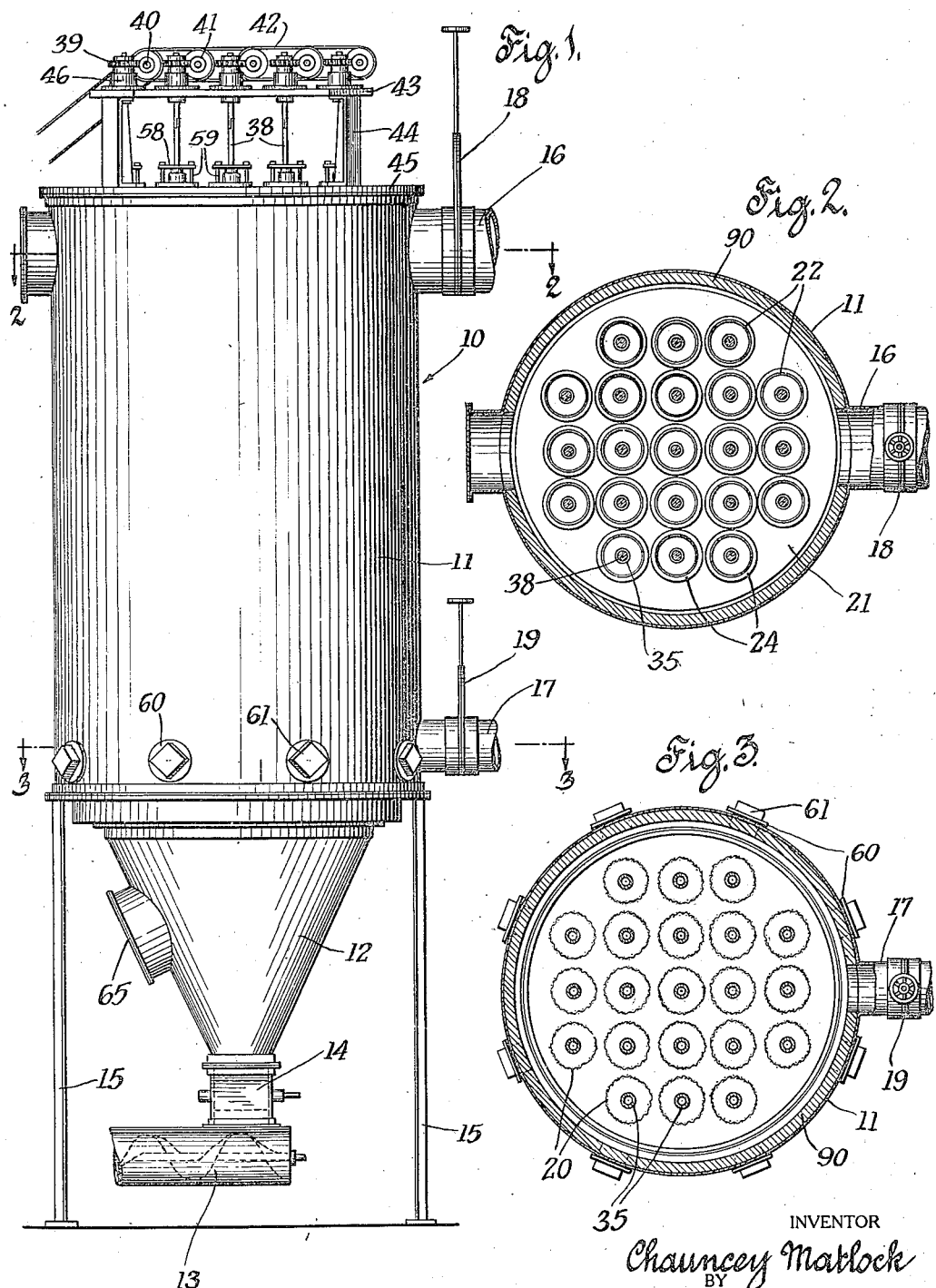

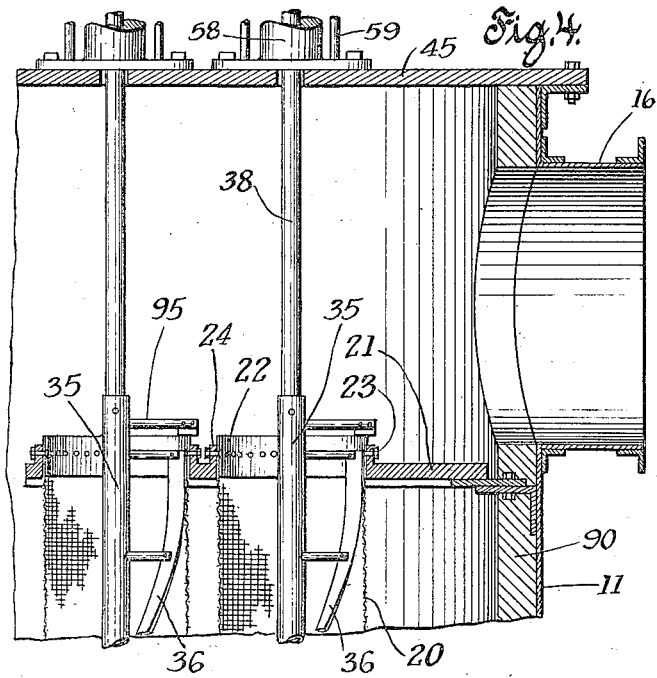
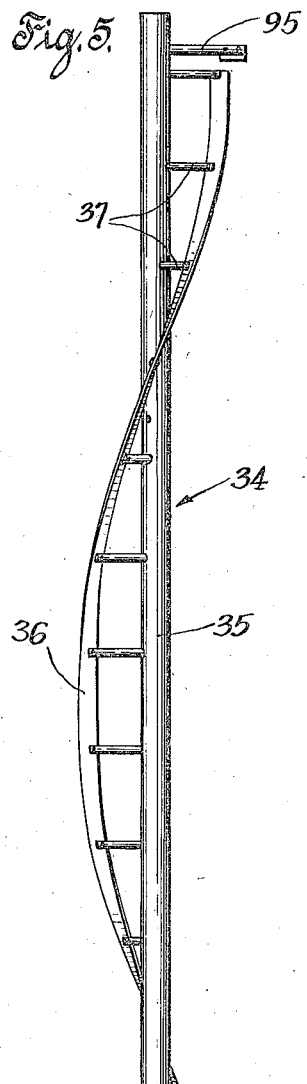
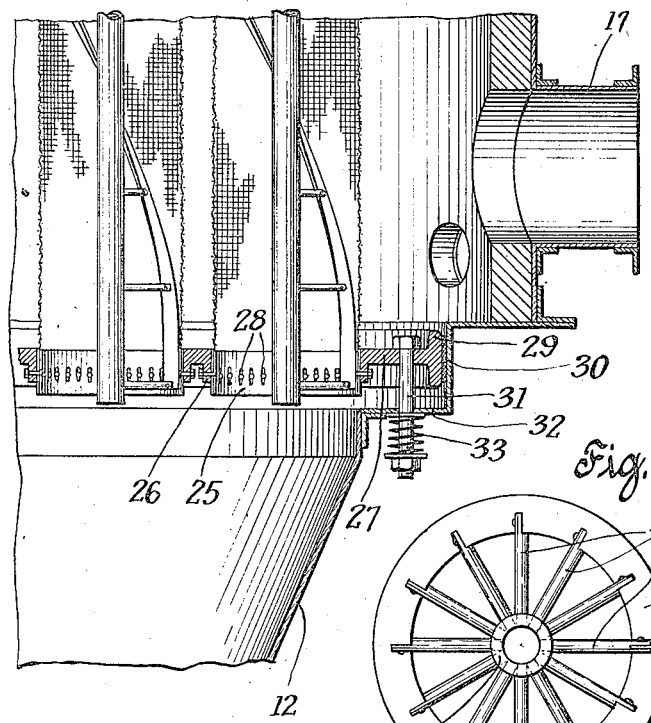
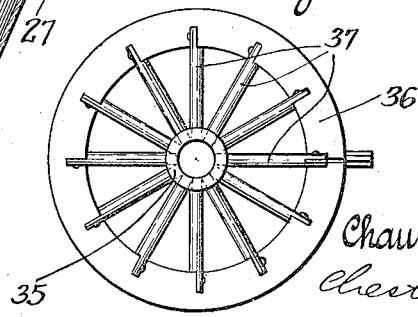

Dec. 10, 1929.  C. MATLOCK  1,738,717
SEPARATOR APPARATUS
Filed Nov. 22, 1923  3 Sheets-Sheet 3
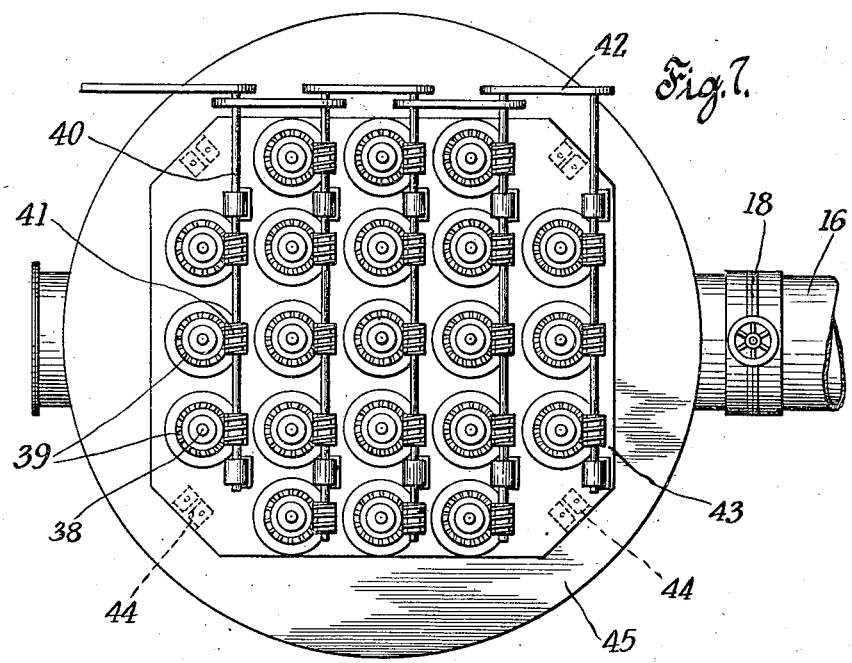
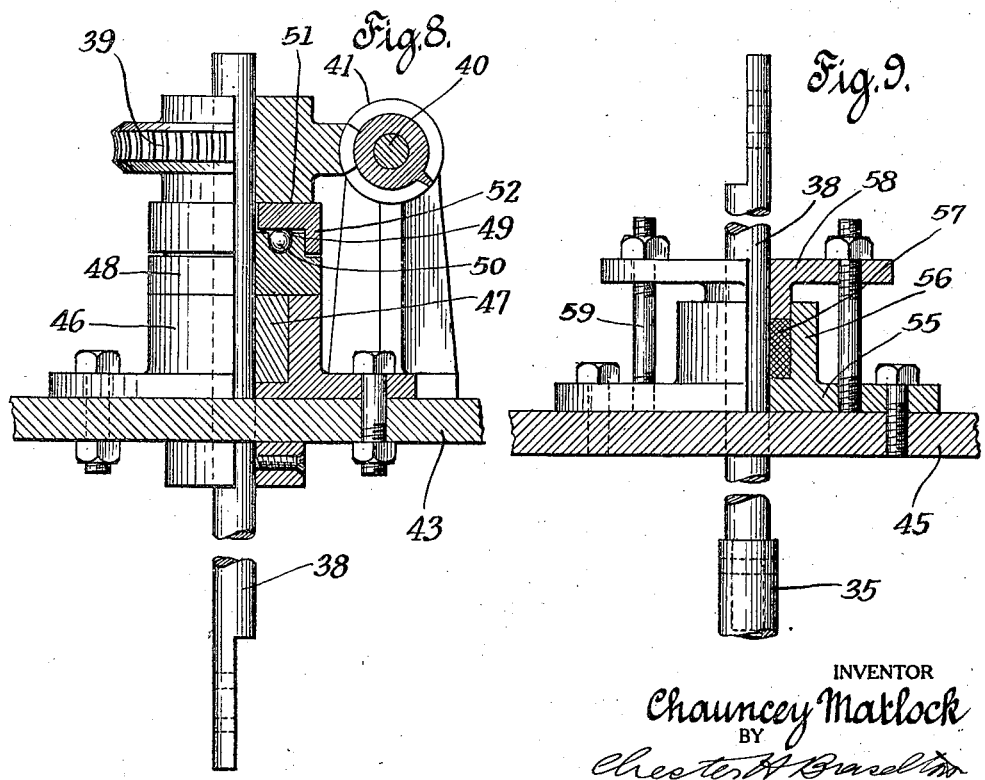
INVENTOR
Chauncey Matlock
BY
ATTORNEY Patented Dec. 10, 1929

1,738,717

UNITED STATES PATENT OFFICE

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE

SEPARATOR APPARATUS

Application filed November 22, 1923. Serial No. 676,458.

This invention relates to an apparatus for separating solid particles from gases at high temperatures, and more particularly to an apparatus for separating carbon-black or soot from hot flue gases.

Broadly stated, the present invention consists in an improved type of separator for removing the solid particles from gases at high temperatures comprising a common housing in which are positioned a plurality of tubular metal screens, all of which are attached at their tops only to a supporting plate within the casing. The bases of the screens are free to move axially of the casing in accordance with the expansion determined by the heat of the gases. The invention also involves the idea of introducing the carbon laden gases at the top of the separator and moving them downwardly through the tubular screens to the base of the seprator where the gases are removed and the separated carbon deposited in a receptacle. The invention also involves the separation of the deposit of carbon from the interior of the screens by means of a power operated spiral scraper rotatable within each tube, adapted to remove the free carbon and permit it to settle in the receptacle at the base of the separator.

In my co-pending application Serial No. 474,496, filed June 2, 1921, Patent No. 1,617,071, there is described a novel arrangement of elements going into a separating system for removing carbon-black from carbon laden gases in which, instead of passing the heated gases from the furnace into direct contact with chilled metal plates where the free carbon is deposited, the heated gases are carried directly from the furnace without cooling into a filter or separator having a plurality of screens, the gases being at such a temperature that the tar and oil are not deposited upon the screens but pass therethrough in a gaseous condition, only the carbon being deposited upon the screen surfaces. In this way a very superior grade of carbon-black has been obtained almost entirely free of tarry and oily substances. Further, in my co-pending application Serial No. 515,673, filed November 16, 1921, Patent No. 1,617,073, there was described a specific type of separator in which metal tubular screens were utilized supported at their bases and freely movable at their tops, there being yielding connections to the top plate by means of springs adapted to take up expansion due to the heating of the gases. In the present application there are shown several important improvements on the separator disclosed in the co-pending application above referred to such as make the separator of special utility in connection with the uses as above described.

Among the objects of the invention, therefore, is the provision of a separator of the class described wherein the separate tubular screens within the separator casing are supported only at their tops. A further object is the provision of means whereby the various separator screens are individually adjustable at the base of the separator. Still another object is contemplated in the provision of packing means surrounding the base plate of the separator which permits free movement of the base in accordance with expansion and contraction due to heat and at the same time prevents the free passage of solids in the gases. Another object is the utilization of resilient connecting means at the base of the screen elements whereby the separator screens are maintained in proper alignment and prevented from rotating in relation to the upper portions thereof. It is an object also of the invention to utilize means whereby the carbon laden gases are led in at the upper end of the separator and conducted downwardly therethrough so that the movement of the gases coincides with the movement of the free carbon as it settles into the base receptacle. An important object of the invention further is the provision of power operated rotatable scrapers, positioned within each of the various tubular screens and adapted by rotation to remove the solid carbon accumulated from the heated gases passing therethrough and permit the same to settle into the receptacle at the base. Further objects are contemplated in the provision of an air lock device at the base of the receptacle; a conveyor at the base of the receptacle beneath the air lock adapted to continuously remove the deposited carbon; the provision of means whereby each screen tube may be removed individually from the casing; a provision of means whereby the screens as a whole may be removed from the separator casing, and further details involving the method of manufacture and construction which may be observable in connection with the description of the specific embodiment of the invention herein disclosed and illustrated in the accompanying drawings, in which Fig. 1 is an elevation of the separator showing the various inlet and outlet connections and conveyor units;

Fig. 2 is a section on lines 2—2 of Fig. 1 showing the assembled screens within the separator interior;

Figure 3 is a section on lines 3—3 of Figure 1;

Figure 4 is a vertical detailed section showing the inlet and outlet connections to the separator and the mechanism of the tubular screens including the scrapers;

Figure 5 is a detail of a scraper;

Figure 6 is a bottom plan view of Figure 5;

Figure 7 is a plan view showing the power means adapted to rotate the scrapers;

Figure 8 shows a detail of the worm drive connection and

Figure 9 shows a detail of the stuffing box on the scraper drive shaft.

Referring to Figure 1 of the drawing, the separator is designated by the numeral 10 and is shown as consisting of a main cylindrical casing 11 at the base of which is mounted a hopper or receptacle 12 having passage into a screw conveyor 13 by means of a rotatable air lock mechanism 14. The structure is mounted upon suitable standards 15 in close relationship to the furnace, not shown, producing the carbon laden gases. Such gases are led from the furnace by means of a conduit 16, passed through the separator downwardly toward its base and led out by means of the conduit 17 to proper condensing and other apparatus to completely utilize the content of the gases and extract all usable material therefrom. Suitable power devices are employed, such as rotatable fans, in order to remove the gases from the separator at the proper speeds to obtain the best results. Slide valve 18, in the conduit 16, and 19, in the conduit 17, are utilized to regulate the rate of flow of gases from the separator.

Within the casing 11, as illustrated more particularly in Figure 4, is a series of individual screen elements 20, suspended from a top plate 21, fastened to the casing at a level beneath the intake port 16. This plate is formed with a number of apertures adapted to receive the tube rings 22 to which they are attached by a series of bolts 23 passing through flanges 24 surrounding the various apertures. Fastened to these tube rings or bands 22, and depending therefrom, are metal screens, preferably of Monel metal having a mesh of about 350 to an inch. The bases of these screen tubes are similarly attached to tube rings or bands 25 which, in turn, are secured to outwardly extending flanges 26, formed in a base plate 27, there being this difference, however, in that the apertures 28, formed in the base ring 25, are vertically elongated so as to permit individual adjustment of the various screens within the base plate apertures to overcome irregularity in construction.

The base plate 27, instead of being attached to the edge of the casing, as is true of the upper plate 21, is extended on its periphery in the form of a ring 29, extending around the plate, in close juxtaposition with the casing. A packing ring 30 is interposed between the ring 29 and the casing so that a close, but not a binding, contact is maintained between the ring of the base plate and the walls of the casing. It is thus seen that the base plate is susceptible of movement upwardly or downwardly in accordance with the expansion and contraction of the metal composing the screens 20 and, inasmuch as the temperatures at which the separating process is carried out are relatively high, this provision for variation in the lengths of the tubes is very important.

It is desirable, however, that the base of the screens should not be rotated with respect to the tops thereof, and to guard against this contingency there is provided a plurality of machine bolts 31 passing through the edge of the base plate 27 adjacent the ring 29 and extending through holes formed in a ledge 32 of the casing. Intermediate the under plates on these bolts and the lower side of the casing shoulder 32 is interposed a coil spring 33 so that the base plate may have movement upwardly or downwardly, the spring 33 yielding to correspond with this movement, but at the same time the rigidity of the bolt prevents rotation of the base plate relative to the upper plate 21. Positioned within each of these tubular screens 20, above referred to, is a rotatable scraper 34, comprising a central shaft or hub 35 and a scraper blade 36 spirally connected to the hub 35 by means of a series of connecting pins 37. This spiral scraper extends from a point adjacent the top of the screen to the base thereof and is so designed that its outer edge comes close to, but not in contact, with the screen. One object of this construction is to prevent undue wear of the metal forming the screen. It has furthermore been found in practice that a small permanent deposition of carbon on the screen increases the efficiency of the separation rather than diminishes the same, and the slight separation between the outer edge of the scraper and the screen permits the formation of a thin film of carbon insufficient to obstruct the apertures in the screen and yet sufficient to increase the separating action of the same.

An auxiliary scraper 95 is indicated as attached to the top of the hub 35 which is adapted to scrape the carbon from the top edge of the screen ring 22.

The hub 35 of the scrapers are each supported by, and attached to, the depending shaft 38 of the worm wheel 39. Referring to Figure 7, it is notable that the various screens are symmetrically arranged so that the worm shafts and worm wheels are grouped in a plurality of aligned rows, each of which is operable by means of a power shaft 40 carrying a plurality of worms 41, each in engagement with the corresponding worm wheel 39. Suitable power transmission means, as indicated by the belts 42, is provided to supply the requisite force to rotate the worm shafts 40. The worm gear assembly is mounted upon the plate 43 supported by suitable standards 44 fastened to the top plate 45 of the casing structure.

Figure 8 illustrates the type of bearing by which the worm wheel 39 is supported, there being indicated a base member 46 enclosing a bushing 47, above which is positioned a bearing 48 containing a runway 49 for the ball bearings 50. Mounted to rotate on the ball bearings is a plate 51 having a depending external flange 52 adapted to maintain the plate in proper position on its base, and to this plate 51 the gear 39 is attached.

In Figure 9 there is disclosed the type of packing utilized to prevent egress of gases from the interior of the separator through leakage past the worm wheel shaft 38. There is shown a plate 55 having an annular cup 56 containing a packing 57 surrounding the worm wheel shaft 38. The pressure plate 58 is adapted to sit over the packing, as illustrated, and to force said packing into close contact with the shaft by means of the bolts 59 connected to the base plate 55.

In order to provide means for having access into the base of the casing 11, a plurality of holes 60 are provided, which are normally closed by screw plugs 61, these holes being positioned around the base of the casing 11 at regular intervals such as found requisite in the operation of the separator. Inasmuch as the action of the separator takes place at relatively high temperatures, the casing 11 is provided with a heat insulating lining 90, extending the full length thereof, whereby the temperature within the separator is maintained fairly constant and at a point approximately equivalent to that at which it emerges from the furnace interior.

The above description relates specifically to the separator with its attached screens and the means, including the spiral scrapers, for removing the free carbon deposited within the screens. After removal by the screens, the free carbon or the carbon-black falls into a hopper 12 of conical formation directly beneath the main casing, the ends of the screens opening directly thereinto. The apex of the cone at its base enters preferably into an air trap apparatus consisting, as illustrated in Figure 1, of a power rotated element having a plurality of fan blades so positioned relative to each other that there is always a barrier to the passage of gases in and out at the base, the rotation of the same therefore permitting the carbon-black to escape into the conveyor 13 at the base of the apparatus. The conveyor 13 is of the ordinary screw type, being preferably power driven to remove the carbon, as it is deposited therein, through an enclosed passageway to storage bins for the carbon-black.

As additional means for obtaining access to the interior of the separator there is provided a manhole 65 on the side of the hopper 12 by means of which the movement of the carbon-black and the state of repair of the screen base may be readily determined.

It is believed that the operation of the separator is readily understandable from the above description. The heated gases from the furnace, laden with free carbon, pass into the separator at its top through the opening 16 being regulated by the valve 18; and under the influence of suction or compression from the power operated fan in the line of communication, the gases are moved outwardly through the various tubular screens 20 and toward the outlet conduit 17. In the passage through the screens the heated gases, which are at such a temperature that the various tarry and oily constituents are in a vaporized condition, the free carbon is deposited upon the inner screen surface, from which it is removed by the rotation of the scrapers 34, as hereinabove indicated. The free carbon, after falling to the hopper 12 and conveyor 13 is removed to storage bins while the gases, relieved of their free carbon, are preferably carried on to condensing chambers and subjected to a further separating or filtering action and may be finally liberated into the atmosphere.

Attention should be directed to certain distinctive features of the improved separator, as above described. The construction of the apparatus, comprising the suspending from an upper plate all of the various screen tubes, leaving the lower ends of the tubes attached to the base plate free to move, is of highest importance when it becomes necessary to remove the whole interior of the casing, for it is readily seen that by removal of the nuts on the bolts 31 and by loosening the bolts by which the top plate 21 and the upper plate 45 are attached to the casing, the whole separator interior may be removed bodily with the greatest ease. This is an exceedingly important consideration in an operative apparatus of this nature. Another important consideration is that by means of the elongated slots 28, any irregularity in the length of individual tubes may be compensated for so that the proper degree of tension for the whole set of screens may be obtained without difficulty. Moreover, the free floating base of the screen structure permits very readily accommodation of the same to variations in length caused by temperature changes, the bolts 31 preventing any rotation of the base plate relative to the suspension plate 21 and at the same time not preventing up and down movement of the base plate. Moreover, the springs 33 on the bolts 31 maintain the screens constantly under a tension so that they are elongated to their natural limit and prevented from wrinkling or bending in such a manner as to destroy the metal screening. It is pointed out further that the packing 30 surrounding the base plate ring 29 prevents a free passage of the furnace gases through the base of the tubes down into the hopper and then up by the ring 29, this being detrimental to the action of the separator inasmuch as it is desirable that all furnace gases pass through the mesh of the screens and deposit the free carbon thereupon. A further consideration, as previously indicated, lies in the fact that instead of passing the gases from the base of the separator upwardly, as has been attempted in other types of apparatus, the furnace gases are led from the top of the separator to the base so that the free falling carbon moves in the current of the heated gases and tends to attain a certain momentum due to gravity which assists materially in the deposition of the carbon-black in the base receptacle. This design of the separator wherein the gases are led into the separator at the top thereof is also advantageous as will be apparent especially from a consideration of Figure 4 in that after passing through the screen there will be a tendency for the gases to rise upwardly outside of the screen within the separator towards the top support plate 21 and to again pass through the screen mesh and outwardly again, thus multiplying the action of the screen in removing the free carbon. Another feature accessory to the invention lies in the fact that the base plate 27 is of sufficient mass to act as a stretching medium for the various screens tending to maintain the same taut and in this way acting in conjunction with the bolt springs 33.

It is apparent from the consideration of the embodiment of the invention hereinabove described that various modifications of the invention may be made, each coming within the spirit of the invention and I intend therefore to claim the same broadly as well as specifically, as indicated by the claims hereto appended

Having thus described the invention, what is claimed is:

1. A separator for removing solids from gases, comprising a separator casing; a plurality of tubular metal screens within the casing; means for supporting said screens at the top thereof, means for permitting limited movement of the bases of said screens, and means for preventing free movement of gases around the bases of said screens, including a base plate having a packing ring integral therewith and in contact with said casing.

2. In an apparatus for removing solids from gases, the combination of a separator casing; a plurality of tubular screens arranged in parallel and adapted to remove solids from the gases, within the casing; means for supporting said screens within the casing; and additional means consisting of a rotatable scraper within each of said screens, for continuously removing the solids from the screens so as to permit continuous passage of the gases therethrough.

3. In an apparatus for removing solids from gases, the combination of a casing; a tubular screen within said casing, said screen being attached at one end only and being freely movable at its other end; a weighted base plate at the lower end of the screen; and means whereby the screen is adjusted relative to the base plate.

4. In an apparatus for removing solids from gases, the combination of a casing; a plurality of tubular screens within the casing; a top plate adapted to support the various screens at their tops within the casing; a base plate attached to the bases of said screens within the casing, movable axially thereto; and means whereby each of the various screens may be adjusted relative to the base plate independently of the other screens.

5. In an apparatus for removing carbon from flue gases, the combination of a casing having an upper inlet port and a lower outlet port; an apertured plate in the top of said casing beneath said inlet port; a plurality of tubular screens attached to said upper plate within said apertures; means for maintaining said screens under a tension; and means for permitting free movement of the lower ends of said screens in accordance with the variation of temperature of the flue gases and means for individually adjusting said screens relative to the screen tensioning means.

6. In an apparatus for removing carbon from flue gases, the combination of a casing having an upper inlet and a lower outlet port; a plurality of tubular screens intermediate said ports, such screens being fixed at their upper ends and movable in the direction of their axes at their lower ends; a scraper in each of said tubular screens for removing the carbon deposited on the inner surface of said screens from the gases passing therethrough; and means for simultaneously operating said scrapers so as to continuously remove the said carbon from the path of the gases.

7. A process for separating carbon black during its manufacture from carbon containing gases so as to prevent inclusion of tarry and oily constituents, which comprises inducting the gases while heated to a temperature at which the said constituents are in a vaporized condition into the upper end of a perforated metallic tube, and withdrawing said gases through the perforations of said tube while the gases remain at substantially the said temperature, thus depositing carbon on the inner wall of the tube without inclusion of the said tarry and oily constituents, and removing said carbon from the tube wall during the separating process.

8. A separator for removing solids from gases comprising a separator casing; a plurality of tubular metal screens within the casing; means for supporting said screens from their tops so as to hang substantially vertically; means for permitting individual limited movement of the bases of each of the screens; and means for preventing the passage of solids around the bases of the screens.

In testimony whereof, I affix my signature.

CHAUNCEY MATLOCK.